Dec. 8, 1931.  W. BELLINGHAUSEN  1,835,628
CONTAINER FOR MOLDING AND COOKING HAMS
Filed June 29, 1929
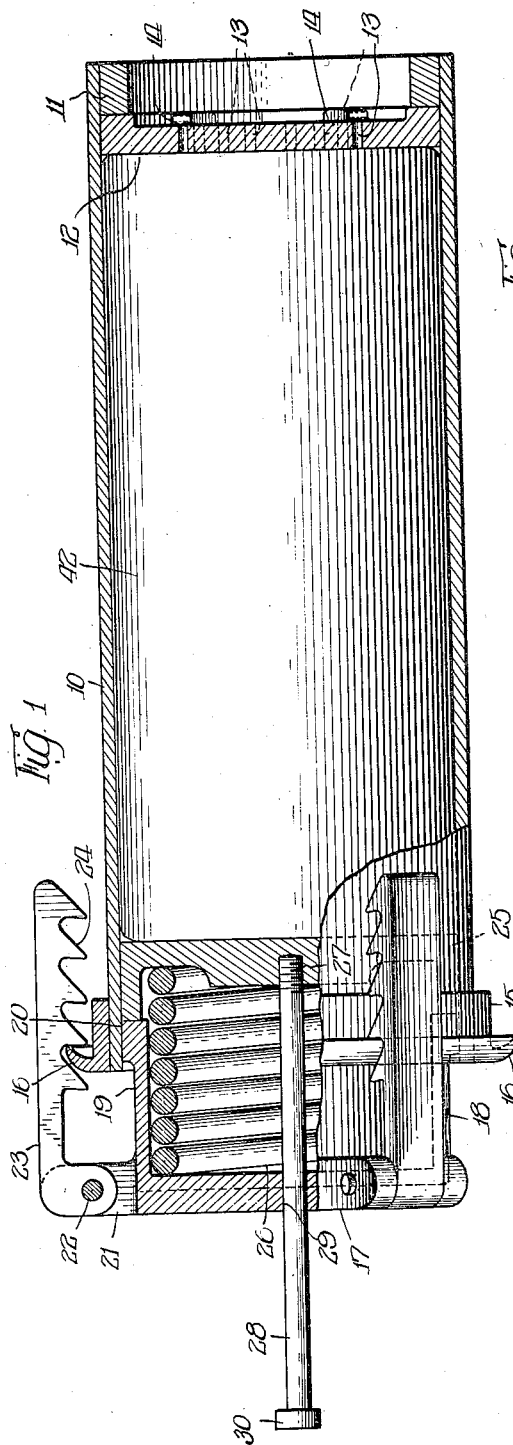
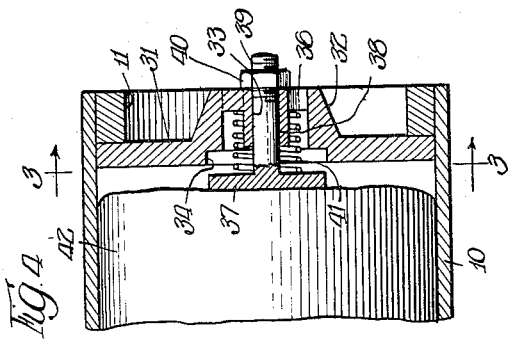
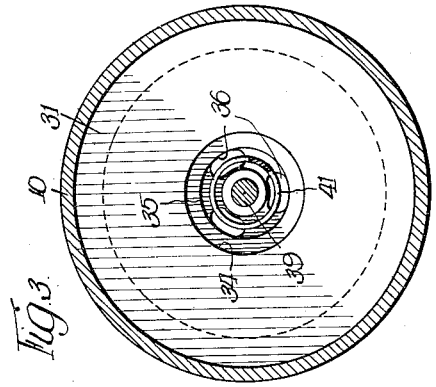
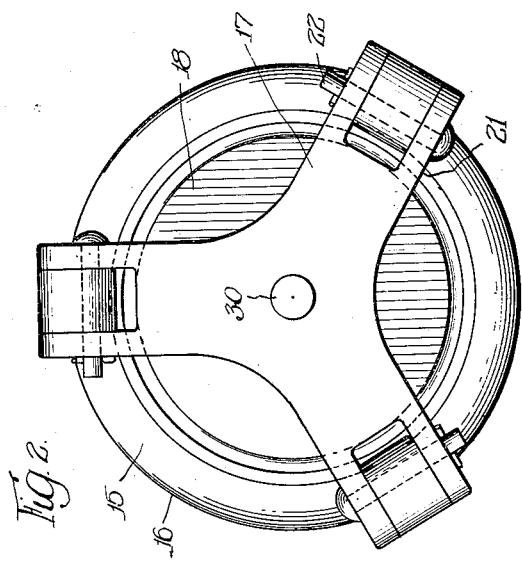
Inventor:
Walter Bellinghausen,
By Wilkinson, Huxley, Byron & Knight
Attys.

Patented Dec. 8, 1931

1,835,628

UNITED STATES PATENT OFFICE

WALTER BELLINGHAUSEN, OF CHICAGO, ILLINOIS, ASSIGNOR TO SWIFT AND COMPANY, OF CHICAGO, ILLINOIS, A CORPORATION OF ILLINOIS

CONTAINER FOR MOLDING AND COOKING HAMS

Application filed June 29, 1929. Serial No. 374,668.

My invention relates to containers for heat treating of food products and more especially to a container for molding and cooking hams or like articles.

The device of which this application is an embodiment is more especially adapted for treating of food products, such as ham, beef or the like, under considerable pressure and heat, and a closed container presents a most satisfactory form for such a device.

A difficulty now presented and which is overcome by my present invention is that of permitting the escape of air from the container when an article such as a ham is being pressed into the container and which makes a close fit with the sides of it, with the resulting entrapment of air in the end or bottom.

Another feature which is brought out herein is a construction which provides for maintaining the pressure on the article after some of the water has been boiled off, which would result in decreasing the volume of the ham or other product were it not taken up in some manner.

It is an object of my invention to provide a container for cooking and molding hams and the like, which is simple, practical and efficient.

Another object is to provide a container which will maintain a practically uniform pressure on an article to be treated during the period of such treatment.

A further object is to provide a container in which entrapped air may be released.

A further object is to provide a container in which the closure may be applied in various positions.

These and other objects and advantages will become apparent and be brought out more fully in the following specification, reference being made to the accompanying drawings, in which Fig. 1 is a sectional view of an embodiment of my invention.

Fig. 2 is an end view thereof showing the cover.

Fig. 3 is a cross section taken along the line 3—3 of Fig. 4, and

Fig. 4 is a fragmentary sectional view of a modified form of the container.

Referring more particularly to the drawings, I show a container 10 which is substantially hollow and somewhat elongated and in the form I have shown is preferably cylindrical. A ring 11 is rigidly secured to the inner wall of the body portion 10 near the end, as shown, and a floor or plate member 12 is adapted to be placed on ring 11, but is of such circumference that it may be removed from the container as desired. Plate 12 is provided with a number of apertures 13 and may have a number of feet 14 for engagement with the ring 11. At the opposite end of the container a collar 15 is rigidly secured to the outer periphery of the body portion 10 and substantially at the end thereof, and is provided with an overhanging shoulder or ring 16. A cap or cover is provided and comprises a spider 17, preferably cast integrally with a cylindrical skirt portion 18 which terminates in a shoulder or ring 20, which makes a sliding fit with the interior of the body portion 10. The spider 17 has a number of outwardly extending arms 21 which are forked and make a hinge connection at 22 with latches 23, which in turn are provided with a number of engaging teeth 24, which are arranged to engage shoulder 16 on collar 15. A presser plate or plunger 25 is provided and is of substantially the cross section of the interior of the container and, separating it from spider 17, is a compression spring 26, which constrains plate 25 away from the spider 17. A threaded recess 27 in plate 25 receives the end of a bolt 28, which passes through an aperture 29 in spider 17. Bolt 28 terminates in a head 30 which is larger than the aperture 29 and prevents bolt 28 from passing through the aperture and limits the movement of plate 25 from spider 17.

In Figs. 3 and 4 I have shown a modified form of an end or floor closure which comprises a cross plate 31, resting against ring 11, and has a central enlargement 32 in which there is a central aperture 33. Plate 31 is provided also with a recess 34 which has a depressed portion 35 which is substantially a cylindrical cut, and in the bottom of depressions 35 are a number of apertures 36, which provide passages from the interior to the exterior of the container through plate 31. A valve 37 seats in recess 34 and has a rod 38 which is threaded at its end 39 to receive a locking nut 40. A spring 41 is maintained in depression 35 and engages the underportion of valve 37 so as to normally maintain the valve in the position shown in Fig. 4. This valve construction is such that when a tight fitting article is being forced into the container the valve will remain open until the article presses on the top of the valve, which will then close the aperture to prevent the further escape of air or moisture.

In operation, a ham or other similar product indicated by the numeral 42 is put into the container and the cover applied by pressing plate 25 against the article, which will compress spring 26 and the latches 23 can be applied to shoulder 16 and the pressure further applied until the article completely fills the container and the latches are in approximately the position shown. During this insertion process the entrapped air will escape through apertures 13. The article may now be placed in a boiler or otherwise treated by the application of heat and such air or moisture as is liberated from the article 42 will escape through apertures 13 and spring 26 will maintain pressure through plate 25 against the article to apply a considerable compression on the article during the heat treating process.

In the alternate form shown in Figs. 3 and 4, when the article 42 is being inserted the entrapped air will escape through recesses 34, depression 35 and apertures 36 until the article, by engaging the valve 37, closes the passage through recess 34 and the container is then practically sealed. The application now of heat will develop an internal pressure in the container and none of the moisture or flavor can escape, which is the result desired. The container being substantially cylindrical and the shoulder 16 being a ring, the cap or cover can be applied in any position thereon, as desired.

The embodiment of my invention shown and described is illustrative only and not understood to limit my invention, and changes and modifications may be suggested without departing from the spirit and scope of the invention as set forth in the appended claims.

Having thus described my invention, what I claim and desire to secure by Letters Patent is:

1. In a ham molding and cooking container, in combination, a substantially cylindrical body portion having a detachable end closure in an end thereof, said closure being provided with a plurality of apertures therein, and a second end closure comprising a spider having a plurality of adjustable latches extending longitudinally of said body portion and having a portion adapted to extend within said body portion, a slidable plate having substantially the cross section of said container, resilient means adapted to constrain said plate away from said spider, and guiding and limiting means therefor, said body portion having a collar provided with a projecting shoulder adapted to engage said latches.

2. In a ham molding and cooking container, in combination, a substantially cylindrical body portion having a closure at an end thereof, comprising an internal ring secured to said cylinder and a plate adapted to engage said ring and having a plurality of apertures therein, the other end of said cylinder having a closure comprising a cap provided with a substantially cylindrical portion adapted to extend into said cylinder and substantially close the same, a slidable plate within said cylinder and of substantially the cross section thereof, an aperture in said cap, a spring engaging said cap and said plate adapted to press said plate inwardly within said cap, and a rod engaging said plate and said aperture adapted to guide and limit the movement of said plate, a plurality of latches hingedly connected to said cap and having a plurality of engaging means, a collar on said cylinder adjacent the end thereof, having an engaging shoulder adapted to engage said latches at any point thereon.

3. In a ham molding and cooking container, in combination, an elongated body portion having a substantially fixed closure at an end thereof, and a relatively adjustable closure at the other end thereof, said fixed closure comprising a member having an opening therein and means adapted to close said opening when said container is filled.

4. In a ham molding and cooking container, in combination, a substantially cylindrical body portion having a relatively removable closure for an end thereof, a relatively fixed closure for the other end thereof, said relatively fixed closure comprising a plate having substantially the cross section of said cylinder, a plurality of openings in said plate, and a plunger adapted to leave said openings unrestricted while said container is being filled and to close said openings when said container has been filled.

Signed at Chicago, Illinois, this 25th day of June, 1929.

WALTER BELLINGHAUSEN.